United States Patent
Baudendistel et al.

(10) Patent No.: US 6,439,556 B1
(45) Date of Patent: Aug. 27, 2002

(54) ACTIVE DECOUPLER HYDRAULIC MOUNT

(75) Inventors: Thomas A. Baudendistel, Farmersville; Sanjiv G. Tewani, Lebanon; Mark W. Long, Bellbrook; James E. Dingle, Cincinnati, all of OH (US); Robert T. Foister, Rochester Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 7 days.

(21) Appl. No.: 09/784,725

(22) Filed: Feb. 15, 2001

(51) Int. Cl.[7] ............................................... F16F 15/00
(52) U.S. Cl. ................................ 267/140.15; 267/141
(58) Field of Search ...................... 267/140.14, 140.15, 267/219, 140.13, 140.11, 140.3, 140.4, 141, 141.2; 188/266.7; 248/636, 535

(56) References Cited

U.S. PATENT DOCUMENTS

| | | | |
|---|---|---|---|
| 4,721,292 A | * 1/1988 | Saito ...................... 267/140.13 |
| 4,773,634 A | * 9/1988 | Hamaekers ............ 267/140.13 |
| 4,789,142 A | * 12/1988 | Hoying et al. ......... 267/140.15 |
| 5,154,263 A | * 10/1992 | Lizell ...................... 188/266.7 |
| 5,516,084 A | * 5/1996 | Rizzo ..................... 267/140.13 |
| 6,193,029 B1 | * 2/2001 | Crawley et al. ......... 188/266.7 |

* cited by examiner

Primary Examiner—Christopher P. Schwartz
Assistant Examiner—Melanie Torres
(74) Attorney, Agent, or Firm—Scott A. McBain

(57) ABSTRACT

A hydraulic mount for an automotive vehicle or machine includes opposed mounting members secured to an elastomeric body and a base, respectively. An orifice plate assembly is interposed the body and the base to define a pumping chamber and a reservoir for fluid to flow therebetween through an orifice track of the orifice plate assembly. An electroactive polymer decoupler member is secured in a cavity formed between two orifice plates of the orifice plate assembly. The decoupler member is operably connected to a controller for imposing an electric field on the decoupler member to change its shape and thereby selectively vary the dynamic stiffness of the mount.

19 Claims, 1 Drawing Sheet

ACTIVE DECOUPLER HYDRAULIC MOUNT

FIELD OF THE INVENTION

The present invention pertains to a hydraulic mount, particularly adapted for automotive powertrain applications, which includes a decoupler member formed of an electroactive polymer whereby the configuration of the decoupler may be modified to modify the dynamic stiffness and damping characteristics of the mount.

BACKGROUND

Hydraulic type vibration damping mounts have been developed which are particularly adapted for automotive powertrain support applications. One type of hydraulic mount includes a decoupler member which is operable to undergo relatively free limited motion in phase with the input vibrations to the mount to provide low dynamic stiffness of the mount to thereby effectively isolate relatively low amplitude vibrations.

Conventional decoupled hydraulic mounts are normally designed such that the passive decoupler has a resonance frequency in a particular range. Conventional hydraulic mounts with passive decouplers typically resonate in the 100 Hertz to 300 Hertz frequency range, for example, and the dynamic stiffness of the mount increases substantially in frequency ranges above the resonance frequency of the decoupler, since the motion of the decoupler is not able to compensate for the volumetric change of the fluid pumping chamber of the mount. Accordingly, reduced isolation of vibrations above the resonant frequency range of the decoupler is experienced and high frequency engine generated vibrations, for example, are typically transmitted to the vehicle body structure.

The vibration isolation characteristics of a hydraulic mount can be varied by imposing certain forces on the decoupler. For example, an air cushion or air "spring" comprising a trapped volume of air between the decoupler and a partition plate can change the damping characteristics of the mount. However, if the motion of the decoupler can be more actively and accurately controlled, the effective dynamic stiffness of the mount can be further reduced at selected frequencies and better isolation characteristics can be obtained for powertrain mounts used in automotive vehicle applications, in particular. For example, it may be desired to control the motion of the decoupler as a function of engine speed (crankshaft revolutions per minute or rpm) such that the vibration isolation characteristics of the mount are achieved in one or more frequency ranges of vibrations related to engine speed and which would be typically input to the mount. It is to these ends that the present invention has been developed.

SUMMARY OF THE INVENTION

The present invention provides an improved hydraulic mount, particularly adapted for automotive vehicle engine and related powertrain applications.

In accordance of one important aspect of the invention, a hydraulic engine or powertrain mount is provided which includes an active decoupler and which has a dynamic stiffness which may be substantially lower than the static stiffness of the mount. Moreover, the dynamic stiffness of the mount may be variably "tuned" to vehicle engine speed, for example, such that the mount provides good vibration isolation between the engine and the vehicle body.

In accordance with another aspect of the invention, a hydraulic mount with an active decoupler is provided wherein the decoupler shape or motion may be controlled in accordance with a particular vibration disturbance acting on the hydraulic mount. In particular, the decoupler is preferably formed of an electroactive polymer material whose shape and/or volume may be changed as a function of imposing an electric field on the decoupler. Accordingly, the decoupler may be actuated such that it is deflected or moved as a function of the vibrations input to the mount and as a consequence the decoupler may influence the dynamic stiffness characteristics of the mount. The mount may be controlled such that a very low magnitude of mount dynamic stiffness is provided at selected vibration frequencies normally imposed on the mount. Under other operating conditions, such as when the vehicle is in motion or under hard acceleration, the decoupler may be configured such as to force hydraulic fluid in the mount to flow through an orifice or orifice track to provide a higher mount dynamic stiffness and damping characteristics which can be used to control or limit the motion of the vehicle powertrain.

In accordance with yet another aspect of the present invention, an active decoupler hydraulic mount is provided which is operable to satisfy substantially all of the requirements for static stiffness, vibration isolation and dynamic stiffness of the mount for all operating characteristics of a vehicle associated with the mount.

Those skilled in the art will further appreciate the advantages and superior features of the invention together with other important aspects thereof upon reading the detailed description which follows in conjunction with the drawing.

DETAILED DESCRIPTION OF A PREFERRED EMBODIMENT

Figure 1:
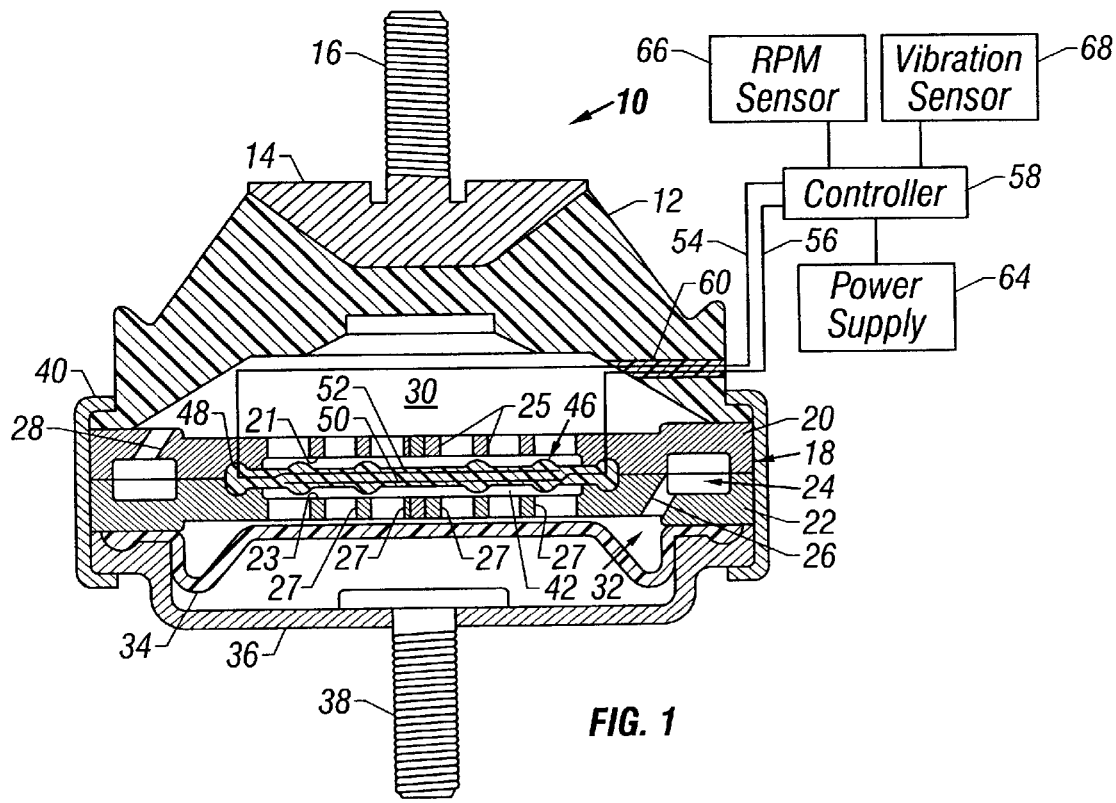
FIG. 1 is a longitudinal central section view, in somewhat schematic form, of an active decoupler hydraulic mount in accordance with the invention.

In the description which follows, like parts are marked throughout the specification and drawing with the same reference numerals, respectively. The drawing figures are not necessarily to scale in the interest of clarity and conciseness.

Referring to FIG. 1, there is illustrated in somewhat schematic form a hydraulic mount adapted for vehicle applications, such as an engine or other powertrain component mount, and generally designated by the numeral 10. The mount 10 includes a substantially frustoconical shaped elastomer body 12 suitably molded to a mounting member 14 having an upward projecting threaded post 16. The mount 10 is also characterized by a generally cylindrical plate-like partition 18 comprising an orifice plate assembly including opposed orifice plates 20 and 22 which are suitably joined to provide at least a partial annular passage 24 formed therebetween. The passage 24, otherwise known as a so-called orifice track, is in communication with fluid transfer ports 26 and 28 which may be circumferentially spaced along the track 24 in such a way as to provide a predetermined path length for transfer of fluid between a pumping chamber 30 and a reservoir 32.

Reservoir 32 is defined in part by the orifice plate assembly 18 and a flexible elastomer diaphragm 34 disposed in a somewhat cylindrical can shaped base plate 36. A second mounting member 38 is suitably secured to the base plate 36 for connecting the mount 10 to a vehicle body structure, not shown. Accordingly, the mounting member 16 may be connected to the vehicle engine or other powertrain component for supporting same relative to the aforementioned vehicle body structure. As shown in FIG. 1, the elastomer body 12, the partition 18, the diaphragm 34 and the base plate 36 may be secured in fluid tight assembly with each other by a suitable annular band 40. The manner of securing the mount components in assembly is exemplary and other means known to those skilled in the art may be used to secure the components together.

Referring further to FIG. 1, the partition 18 includes a generally cylindrical shallow cavity 42 formed by cylindrical recessed wall parts 21 and 23 formed in the orifice plates 20 and 22. Plural fluid transfer ports 25 and 27 open into the cavity 42 from the pumping chamber 30 and from the reservoir 32, respectively.

The cavity 42 between the plates 20 and 22 is at least partially filled with a generally cylindrical disk-shaped decoupler member 46 having a peripheral circumferential flange 48 formed thereon and clamped between the orifice plates 20 and 22 of the orifice plate assembly or partition 18 in substantially fluid tight engagement to prevent fluid leakage across the decoupler member 46 between the pumping chamber 30 and the reservoir 32. The decoupler 46 is formed of an electroactive polymer which may be selected from one of a type described further herein. The decoupler member 46 is also characterized by suitable electrodes 50 and 52, shown spaced apart from each other and embedded in the decoupler member. The electrodes 50 and 52 are connected, respectively, to suitable conductors 54 and 56 leading to a controller 58. Conductors 54 and 56 are shown encapsulated in a sleeve 60 which penetrates the elastomer body 12 but forms a fluid tight seal between the pumping chamber 30 and the exterior of the mount 10. Other arrangements of conductor members or leads connected to the electrodes 50 and 52 may be provided.

Controller 58 is suitably connected to an electrical power supply 64 and may also be connected to a suitable engine crankshaft speed (rpm) sensor 66 and/or a suitable vibration sensor 68, both operable, if desired, to provide input signals to the controller to cause the controller to apply a selectively controlled voltage across the electrodes 50 and 52. The decoupler member 46 comprises a suitable electroactive polymer, such as polyacrylonitrile, or other suitable ion exchange polymers selected from a group consisting of polyvinyl-chloride, silicone rubber and similar conducting polymers. Moreover, the configuration of the decoupler member 46 may be varied and may be, for example, such as to provide a layered construction of elastomer films sandwiched between compliant electrodes, such as the electrodes 50 and 52. The electrodes 50 and 52 may be a thin film of highly conductive material or a conductive grease layer, for example. In all events, when a voltage is applied across the electrodes 50 and 52, the shape of the decoupler member 46 may be changed in a selected manner.

For example, when an electric potential is applied across the electrodes 50 and 52, the decoupler member 46 may change its shape in such a way as to provide for motion or deflection within the space 42 toward wall part 21 and away from wall part 23 or vice versa. The amount of deflection may be controlled by varying the electric potential imposed on the decoupler in relation to engine speed or vibrations sensed by the sensors 66 and 68. The decoupler member 46 may be forced to move in the aforementioned space 42 as a function of a vibration disturbance input to the mount 10 such that the resistance to the motion of the mount is substantially reduced. Consequently, the effective dynamic stiffness of the mount 10 may be reduced and in turn provide good isolation for low amplitude higher frequency vibrations. For example, with an unbalanced engine running at idle conditions or during smooth road cruise conditions, when good isolation is required from the engine mounts to reduce the noise transmitted from the engine to the passenger compartment, the decoupler 46 may be activated by the controller 58 as a function of the vibrations at selected frequencies to be isolated.

However, during events such as rough road driving conditions or other conditions which result in large displacements of the engine and/or any other powertrain component to which the mount is connected, the decoupler 46 may be de-energized or forced to become rigid or expand to substantially fill the space 42 so that fluid may be forced from the pumping chamber 30 through the orifice track 24 by way of the ports 28 and 26 into the reservoir 32 and vice-versa. Accordingly, under such conditions the mount 10 exhibits a higher dynamic stiffness to control large-scale displacements of the engine and/or other component of the powertrain to which the mount may be connected. Accordingly, the mount 10 can be "tuned" to various operating conditions in a way that satisfies essentially all the requirements for static stiffness, vibration isolation and dynamic stiffness under a wide range of operating conditions.

Figure 2:
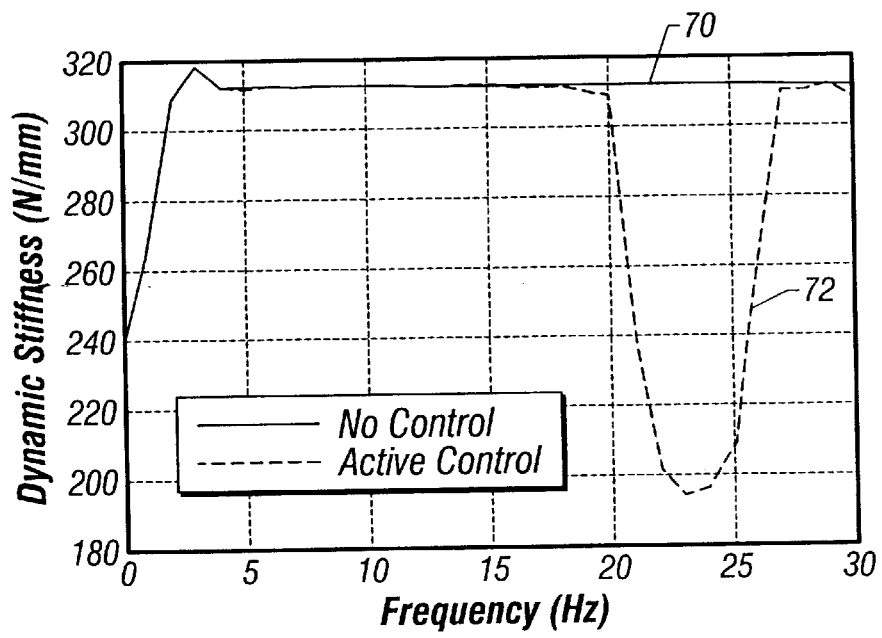
FIG. 2 is a diagram of dynamic stiffness versus frequency showing a typical operating characteristic for an actively controlled mount in accordance with the invention.

Referring briefly to FIG. 2, there is illustrated a diagram of dynamic stiffness of a mount such as the mount 10 showing the characteristics of the mount over a range of zero to thirty Hertz (Hz) wherein there is no control over the decoupler member 46. This characteristic is indicated by the curve 70. The example given is using as a model a four-cylinder engine supported by the mount 10 at a crankshaft speed of 720 rpm resulting in a secondary vibration of 24 Hertz transmitted from the engine to the mount. However, the curve 72 shows the effect of energizing the electroactive polymer decoupler member 46 to change its shape. The mount 10 may be energized cyclically at the frequency of the vibration to be isolated and also at a selected phase angle in relation to the vibration.

The construction and operation of the mount 10 is believed to be within the purview of one of ordinary skill in the art based on the foregoing description. Conventional engineering materials may be used to construct substantially all parts of the mount except the decoupler member 46 which, as previously described, is selected to be of a composition which responds to an electric field to change its shape in one or more ways. A suitable hydraulic fluid is provided to fill the pumping chamber 30 and the reservoir 32 in a conventional manner. An ethylene glycol-water mixture may be provided as the hydraulic fluid. The sizes of the orifices 26 and 28 as well as their placement relative to each other around the orifice track 24 may also be selected in accordance with the desired stiffness and vibration damping characteristics required for the mount 10.

Although a preferred embodiment of the invention has been described in detail therein, those skilled in the art will recognize that various substitutions and modifications may be made without departing from the scope and spirit of the appended claims.

What is claimed is:

1. A hydraulic mount for an operating component of a vehicle comprising:

first and second mounting members;

a body connected to one of the mounting members and a
     base connected to the other of the mounting members;

a partition interposed between said body and said base;

a fluid pumping chamber formed between said body and said partition and a fluid reservoir formed between said partition and a member interposed said partition and said base;

a cavity in said partition; and a decoupler member supported in said cavity and in fluid communication with at least one of said pumping chamber and said reservoir, said decoupler member being formed of an electroactive polymer and adapted to be connected to a source of electric potential for changing the configuration of said decoupler member.

2. The mount set forth in claim 1 wherein:

said partition comprises an orifice plate assembly including an orifice track formed therein for transferring fluid between said pumping chamber and said reservoir.

3. The mount set forth in claim 2 wherein:

said member interposed said orifice plate assembly and said base comprises a flexible diaphragm delimiting said reservoir.

4. The mount set forth in claim 2 wherein:

said orifice plate assembly includes a first orifice plate including a plurality of openings formed therein for providing fluid communication between said pumping chamber and said decoupler member.

5. The mount set forth in claim 4 wherein:

said orifice plate assembly includes a second orifice plate including a plurality of openings therein for providing fluid communication between said reservoir and said decoupler member and said cavity is formed between said orifice plates.

6. The mount set forth in claim 5 wherein:

said decoupler is secured in fluid tight sealing engagement around a periphery of said decoupler member between said orifice plates.

7. The mount set forth in claim 1 including:

conductor means connected to spaced apart electrodes of said decoupler member and a controller operably connected to said conductor means for imposing an electric field on said decoupler member.

8. The mount set forth in claim 7 wherein:

said controller is operably connected to a sensor for sensing vibrations of a structure supported by said mount.

9. The mount set forth in claim 7 wherein:

said controller is operably connected to a speed sensor for sensing a rotational speed of an engine whose vibrations are to be damped by said mount.

10. The mount set forth in claim 1 wherein:

said decoupler is formed of a material selected from a group consisting of polyacrylonitrile, polyvinylchloride, silicone rubber and electric conductive polymers.

11. A hydraulic mount for an operating component of a vehicle comprising:

first and second mounting members;

a body connected to one of the mounting members and a base connected to the other of the mounting members;

a partition interposed between said body and said base and defining a cavity, said partition including an orifice track formed therein for transferring fluid between a fluid pumping chamber and a fluid reservoir of said mount; and a decoupler member supported in said cavity and in fluid communication with at least one of said pumping chamber and said reservoir, said decoupler member being formed of an electroactive polymer, and adapted to be operably connected to a source of electric potential for selectively changing the configuration of said decoupler member to vary the dynamic stiffness of said mount.

12. The mount set forth in claim 11 wherein:

said partition comprises an orifice plate assembly comprising a first orifice plate including a plurality of openings formed therein for providing fluid communication between said pumping chamber and said decoupler member.

13. The mount set forth in claim 12 wherein:

said orifice plate assembly includes a second orifice plate including a plurality of openings therein for providing fluid communication between said reservoir and said decoupler member.

14. The mount set forth in claim 13 wherein:

said cavity is formed between said orifice plates.

15. The mount set forth in claim 14 wherein:

said decoupler member is secured in fluid tight sealing engagement around a periphery of said decoupler member between said orifice plates.

16. The mount set forth in claim 11 including:

conductor means connected to respective electrodes of said decoupler member and a controller operably connected to said conductor means and a source of electric power for imposing an electric field on said decoupler member at a selected frequency to effect deflection of said decoupler member in such a way as to modify the dynamic stiffness of said mount.

17. The mount set forth in claim 16 wherein:

said controller is operably connected to a sensor for sensing vibrations of a structure supported by said mount.

18. The mount set forth in claim 16 wherein:

said controller is operably connected to a speed sensor for sensing a rotational speed of an engine whose vibrations are to be damped by said mount.

19. A hydraulic mount for an operating component of a vehicle comprising:

first and second mounting members;

a body connected to one of the mounting members and a base connected to the other of the mounting members;

a partition interposed between said body and said base and defining a cavity, said partition comprises an orifice plate assembly including a first orifice plate and having a plurality of openings formed therein for providing fluid communication between said pumping chamber and said cavity and a second orifice plate including a plurality of openings therein for providing fluid communication between said reservoir and said cavity;

a decoupler member supported in said cavity and in fluid communication with said pumping chamber and said reservoir, said decoupler member being formed of an electroactive polymer, and adapted to be operably connected to a source of electric potential for selectively changing the configuration of said decoupler member to vary the dynamic stiffness of said mount;

conductor means connected to respective electrodes of said decoupler member; and a controller operably connected to said conductor means and a source of electric power for imposing an electric field on said decoupler member at a selected frequency to effect deflection of said decoupler member in such a way as to modify the dynamic stiffness of said mount.

\* \* \* \* \*